US007523497B2

(12) United States Patent
Cohen

(10) Patent No.: US 7,523,497 B2
(45) Date of Patent: Apr. 21, 2009

(54) PACKET FLOODING DEFENSE SYSTEM

(76) Inventor: Donald N. Cohen, 2815 Haddington Dr., Los Angeles, CA (US) 90064

( * ) Notice: Subject to any disclaimer, the term of this patent is extended or adjusted under 35 U.S.C. 154(b) by 719 days.

(21) Appl. No.: 10/841,064

(22) Filed: May 7, 2004

(65) Prior Publication Data

US 2004/0230839 A1    Nov. 18, 2004

Related U.S. Application Data

(63) Continuation of application No. 09/715,813, filed on Nov. 16, 2000, now Pat. No. 6,789,190.

(51) Int. Cl.
*G06F 11/30* (2006.01)
(52) U.S. Cl. .............. 726/22; 726/25; 709/235; 709/238; 709/239; 709/240; 370/229; 370/231; 370/235; 370/237
(58) Field of Classification Search ........... 726/22
See application file for complete search history.

(56) References Cited

U.S. PATENT DOCUMENTS

| | | | | |
|---|---|---|---|---|
| 5,007,052 A | * | 4/1991 | Flammer ............... 370/389 |
| 5,353,353 A | * | 10/1994 | Vijeh et al. ............ 380/29 |
| 5,367,523 A | * | 11/1994 | Chang et al. .......... 370/235 |
| 5,434,860 A | * | 7/1995 | Riddle .................. 370/232 |
| 5,455,865 A | * | 10/1995 | Perlman ............... 713/153 |
| 5,581,559 A | * | 12/1996 | Crayford et al. ....... 370/392 |
| 5,850,515 A | * | 12/1998 | Lo et al. ............... 714/43 |
| 6,044,402 A | * | 3/2000 | Jacobson et al. ....... 709/225 |
| 6,088,804 A | * | 7/2000 | Hill et al. ............. 726/25 |
| 6,412,000 B1 | * | 6/2002 | Riddle et al. .......... 709/224 |
| 2002/0032871 A1 | * | 3/2002 | Malan et al. ........... 713/201 |

OTHER PUBLICATIONS

Yaar, A., et al, 'StackPi: New Packet Marking and Filtering Mechanisms for DDoS and IP Spoofing Defense', IEEE Journal on Selected Areas in Communications, vol. 24, No. 10, Oct. 2006, entire document, http://ieeexplore.ieee.org/stamp/stamp.jsp?arnumber=01705617.*

* cited by examiner

*Primary Examiner*—Kambiz Zand
*Assistant Examiner*—Ronald Baum
(74) *Attorney, Agent, or Firm*—David A. Belasco; Belasco Jacobs & Townsley, LLP

(57) ABSTRACT

The invention prevents "packet flooding", where an attacker uses up all available bandwidth to a victim with useless data. It can also be used to prevent some other related denial of service attacks. The defense is distributed among cooperating sites and routers. The sites identify data they don't want. The routers help sites to determine which routers forward that data. The sites then ask these routers to reduce the rate at which such data is forwarded. Variations of the defense protect against packet flooding attacks on routers and attacks in which an attacker tries to use up some service offered by a site.

18 Claims, 9 Drawing Sheets

PACKET FLOODING DEFENSE SYSTEM

CROSS REFERENCE TO RELATED APPLICATIONS

This Application is a continuation of U.S. patent application Ser. No. 09/715,813, filed 11/16/2000 now U.S. Pat. No. 6,789,190.

FIELD OF INVENTION

The invention pertains to network data transmission controls. More particularly, the invention relates to systems for minimizing the effects of packet flooding attacks directed against computers or routers connected to a network.

BACKGROUND OF THE INVENTION

Various types of systems have been developed for handling unwanted network data transmission incorporating a number of different technologies. U.S. Pat. No. 5,581,559 issued to Crayford et al. discloses a method that verifies the integrity of data transmitted over a network by comparing the destination address for a data packet with end station addresses stored on network repeaters. Where the destination address fails to match the stored end station addresses, the data packet will be disrupted.

U.S. Pat. No. 6,044,402 issued to Jacobson et al., describes a system in which the only data packets that are transmitted between source and destination network addresses are those that satisfy the blocking policies stored by the blocking data structure. Thus only, "pre-approved" data can flow through such a control mechanism. U.S. Pat. No. 5,455,865, issued to Perlman discloses a system that relies upon a stored list of acceptable packet identifiers at each node in the network. U.S. Pat. No. 5,353,353 issued to Vijeh et al. describes a system that determines the acceptability of data packets based upon a destination address/source address match and will disrupt any packet not satisfying these criteria. U.S. Pat. No. 5,850,515 issued to Lo et al. discloses a system that uses source and destination address matching to determine if packets should be transmitted to an end station or the end station disabled from participating in the network. It also employs a system where an end station can be disabled by a program that determines that a certain number of unauthorized packets have been detected. While other variations exist, the above-described designs for handling unwanted network data transmissions are typical of those encountered in the prior art.

U.S. Pat. No. 5,367,523 to Chang et al. discloses an end-to-end, closed loop flow and congestion control system for packet communications networks which exchanges rate request and rate response messages between data senders and receivers to allow the sender to adjust the data rate to avoid congestion and to control the data flow. Requests and responses are piggy-backed on data packets and result in changes in the input data rate in a direction to optimize data throughput. GREEN, YELLOW and RED operating modes are defined to increase data input, reduce data input and reduce data input drastically, respectively. Incremental changes in data input are altered non-linearly to change more quickly when further away from the optimum operating point than when closer to the optimum operating point. Chang, et al, is intended for end-to-end congestion control. Congestion control assumes cooperation between sender and receiver in solving the problem. In a packet flooding defense, the sender, who is the attacker, will never cooperate with the receiver, his victim. In Chang, et al, the information used is the source/destination address pairs in the packet. Chang, et al, assume this information is accurate. In an attack, this information will not be. The attacker will falsify the source address in order to confound the defense if it uses information the attacker controls, such as the source address.

The primary objective of the present invention is to defend against "packet flooding attacks" in which an attacker tries to use up all the bandwidth to the victim by sending data of little or no value (at least to the victim), thereby making more valuable communication with the victim slow or unreliable. A secondary objective is to defend against a related class of attacks in which the attacker tries to use up some other resource by sending more requests of some particular type to the victim than the victim can handle.

One way to view all these attacks is that a resource is being allocated in an unfair way. Well-behaved users request reasonable amounts, while attackers request unreasonable amounts. The most straight-forward allocation mechanism, which might be called "first come first served", ends up allocating almost all of the resource to the attackers. A more "fair" allocation would reduce the impact of an attacker to that of a normal user.

There are two obvious impediments to the "fair service" goal above. One is lack of a reliable way to associate incoming packets with those users among whom bandwidth should be fairly allocated. The other is lack of control over what packets arrive. The solution described here to both of these problems requires help from the routers that forward packets to the victim.

The defense is distributed among cooperating sites and routers. A set of transitively connected cooperating machines is called a "cooperating neighborhood". The quality of the defense is related to the size of the cooperating neighborhood, a larger neighborhood providing better defense. Within the neighborhood it is possible to trace the forwarding path of packets. The association of packets with the "users" is approximated by associating packets with "places" in the cooperating neighborhood from which those packets are forwarded. That is, service will be allocated in a fair (or otherwise reasonable) manner among these places. A "place" in this sense is typically a particular interface from which a packet arrived at a cooperating router.

One such place is likely to be shared by many actual users. An attack will deny service to those users sharing the same place. The advantage of a large number of such places is that each place is shared by fewer users, so an attack will deny service to fewer users. It is advantageous to a user who wants to communicate with a particular machine, to be in the cooperating neighborhood of that machine, since no attacker from another machine can deny him service. Conversely, an attacker wishing to deny service to as many users as possible prefers to share an entry point into the cooperating neighborhood with as many users as possible.

Routers will supply data about the forwarding path of the packets that arrive at a site. The site can use this data to allocate service as described above among the packets that arrive. This would solve the problem of unfair service if the packets that arrived were a fair sample of those that were sent to the site. This may not be the case, however, if routers are unable to forward all the packets they receive. To some extent fair service is limited by network topology, i.e., too many legitimate users trying to share parts of the same path will inevitably suffer relative to users of uncrowded paths. However another potential cause for this problem is a flooding attack against a router. That problem is solved by letting routers allocate their services in a similar way to that described above for sites. That is, they allocate the limited resource of forwarding bandwidth along any given output in a reasonable way among some set of places in the cooperating neighborhood.

The final step in the defense is that cooperating routers will limit the rate at which they forward packets to places that so request. This may not be essential in the allocation of service, but it is useful for limiting the bandwidth used by "unwanted" packets. The rate-limiting request is to be made when a site detects a high rate of unwanted packets coming from one place. This helps the site because it no longer has to process as many unwanted packets. It helps the network by freeing some of the bandwidth for other use.

Even if the traffic is not reduced, the distinction between "wanted" and "unwanted" packets plays an important role in "reasonable" allocation. For a site there are normally some packets (in fact, the great majority) that are expected in a very strong sense. It is reasonable to process these at the highest possible rate. All other packets are not exactly unwanted, but the site is willing to process them at only a limited rate. A reasonable approach is to schedule these as described above (using the places from which they were forwarded) at a limited rate, and regard as "unwanted" those that end up being significantly delayed (or discarded).

SUMMARY OF THE INVENTION

The present invention addresses many of the deficiencies of prior network defense systems and satisfies all of the objectives described above.

A packet flooding defense system for a network providing the desired features may be constructed from the following components. The network includes a plurality of host computers, routers, communication lines and transmitted data packets. Means are provided for classifying data packets received at a host computer as are means for associating a maximum acceptable processing rate with each class of data packet received at the computer. Means are also provided for the computer to find information for packets it receives regarding the path by which the packets came to the computer. Thus, the computer can use the information to allocate the processing rate available for packets of each class in a desired way.

In another variant, a packet flooding defense system for a network including a plurality of host computers, routers, communication lines and transmitted data packets includes means for classifying data packets received at a host computer and means for associating a maximum acceptable processing rate with each class of data packet received at the computer. Means are provided for the computer to determine the rate at which data packets of each class are transmitted from a router to the computer as are means for the router to receive information regarding maximum acceptable transmission rate for data packets being transmitted to the computer. Means are provided for the router to control the rate of transmission of data packets from the router to the computer. Thus, the rate of data packet transmissions received at the computer is kept below the maximum acceptable processing rate for each data packet class by the control of the rate of transmission of data packets from the router, thereby freeing a portion of the network providing data packet transmission to the computer.

In this invention a path (which is not controlled by the attacker) is used to determine the actual direction of the packet flow towards the victim. Bandwidth is allocated based upon path (which is done via packet marks provided by routers leading up to the victim). In other words this invention uses attacker-independent information about the path a packet takes to allocate forwarding bandwidth in a router. The part that makes this invention completely different from Chang, et al, is that the information has to be attacker-independent (i.e., sender-independent) in order to work as a defense.

In yet another variant, the router is capable of receiving information regarding maximum acceptable transmission rate for each class of data packet being transmitted to the computer and the router is capable of controlling the rate of transmission of each class of data packets to the computer.

In still another variant, a packet flooding defense system for a network including a plurality of host computers, routers, communication lines and transmitted data packets includes means for classifying data packets received at a router and means for associating a maximum acceptable transmission rate with each class of data packet received at the router. Means are provided for the router to find information for packets it receives regarding the path by which the packets came to the router. Thus, the router can use the information to allocate the transmission rate for each class in a desired way.

In a further variant of the invention, a packet flooding defense system for a network including a plurality of host computers, routers, communication lines and transmitted data packets includes means for classifying data packets received at a first router and means for associating a maximum acceptable transmission rate with each class of data packet received at the first router. Means are provided for the first router to determine the rate at which data packets of each class are transmitted from a second router to the first router as are means for the second router to receive information regarding maximum acceptable transmission rate for data packets being transmitted to the first router. Means are provided for the second router to control the rate of transmission of data packets from the second router to the first router. Thus, the rate of data packet transmissions received at the first router is kept below the maximum acceptable transmission rate for each data packet class by the control of the rate of transmission of data packets from the second router, thereby freeing a portion of the network providing data packet transmission to the first router.

In yet a further variant, the second router is capable of receiving information regarding maximum acceptable transmission rate for each class of data packet being transmitted to the first router and the second router is capable of controlling the rate of transmission of each class of data packets to the first router.

In another variant, a packet flooding defense system for a network including a plurality of host computers, routers, communication lines and transmitted data packets includes at least one firewall. The firewall includes hardware and software serving to control packet transmission between the network and a host computer connected to an internal network. Means are provided for classifying data packets received at the firewall as are means for associating a maximum acceptable transmission rate with each class of data packet received at the firewall. Means are provided for the firewall to find information for packets it receives regarding the path by which the packets came to the firewall. Thus, the firewall can use the information to allocate the transmission rate for each class in a desired way.

In still another variant of the invention, a packet flooding defense system for a network including a plurality of host computers, routers, communication lines and transmitted data packets includes at least one firewall. The firewall includes hardware and software serving to control packet transmission between the network and a host computer connected to an internal network and means for classifying data packets received at the firewall. Means are provided for associating a maximum acceptable transmission rate with each class of data packet received at the firewall as are means for the firewall to determine the rate at which data packets of each class are transmitted from a router to the firewall. Means are provided for the router to receive information regarding maximum acceptable transmission rate for data packets being transmitted to the firewall as are means for the router to control the rate of transmission of data packets from the router to the firewall. Thus, the rate of data packet transmissions received at the firewall is kept below the maximum acceptable transmission rate for each data packet class by the control of the rate of transmission of data packets from the router, thereby freeing a portion of the network providing data packet transmission to the firewall.

In a final variant of the invention, the router is capable of receiving information regarding maximum acceptable transmission rate for each class of data packet being transmitted to the firewall and the router is capable of controlling the rate of transmission of each class of data packets to the firewall.

An appreciation of the other aims and objectives of the present invention and an understanding of it may be achieved by referring to the accompanying drawings and the detailed description of a preferred embodiment.

DETAILED DESCRIPTION OF THE PREFERRED EMBODIMENT

Figure 1:
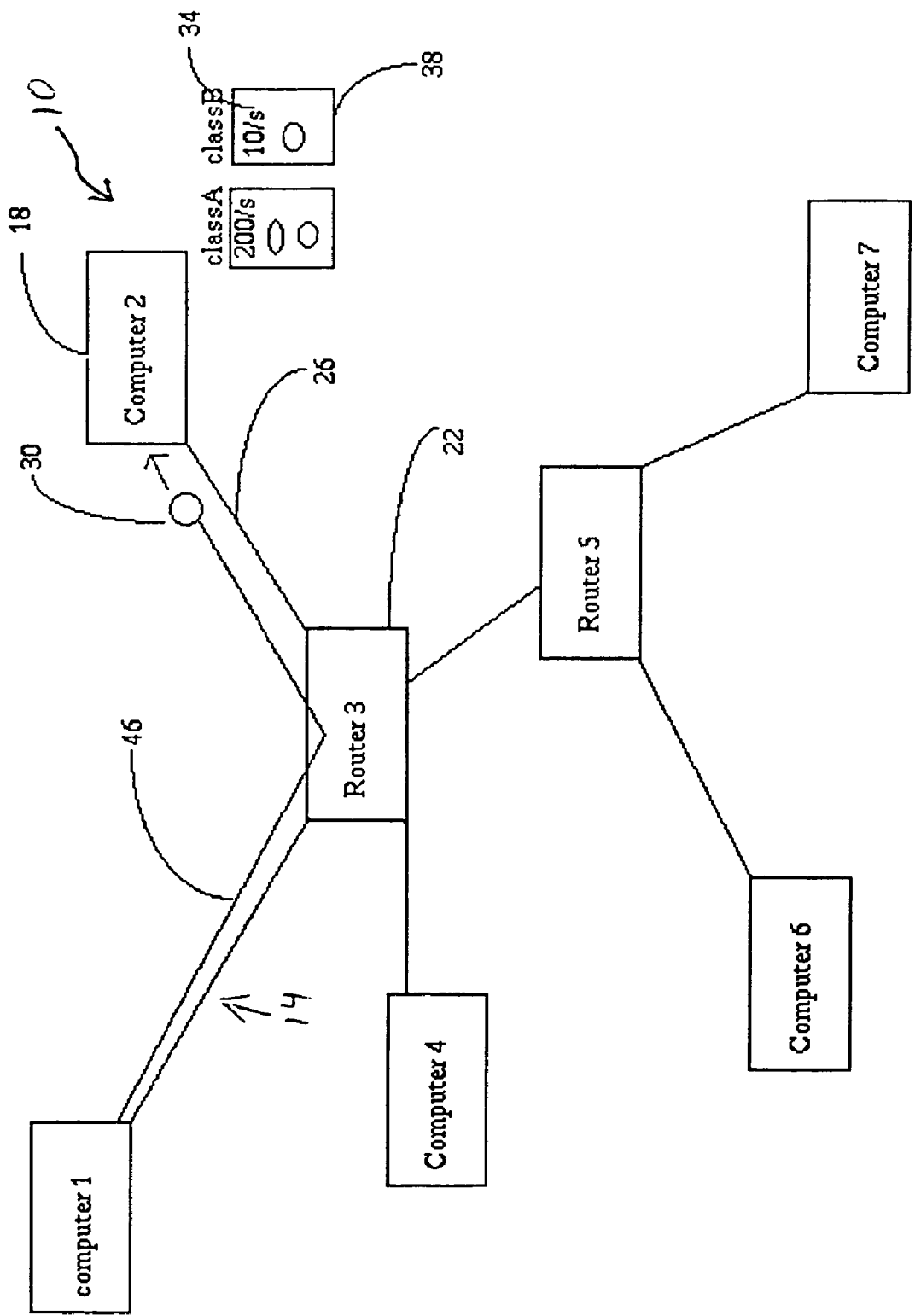
FIG. 1 is a schematic view of a first embodiment of the invention illustrating the association of maximum acceptable processing rates for each class of packet received at a computer and a path by which the packets came to the computer.

FIG. 1 illustrates a packet flooding defense system 10 for a network 14 providing the desired features that may be constructed from the following components. The network 14 includes a plurality of host computers 18, routers 22, communication lines 26 and transmitted data packets 30. Means are provided for classifying data packets 30 received at a host computer 18 as are means for associating a maximum acceptable processing rate 34 with each class 38 of data packet 30 received at the computer 18. Means are also provided for the computer 18 to find information for packets 30 it receives regarding the path 46 by which the packets 30 came to the computer 18. Thus, the computer 18 can use the information to allocate the processing rate for each class 38 in a desired way among the places from which packets 30 are transmitted.

Figure 2:
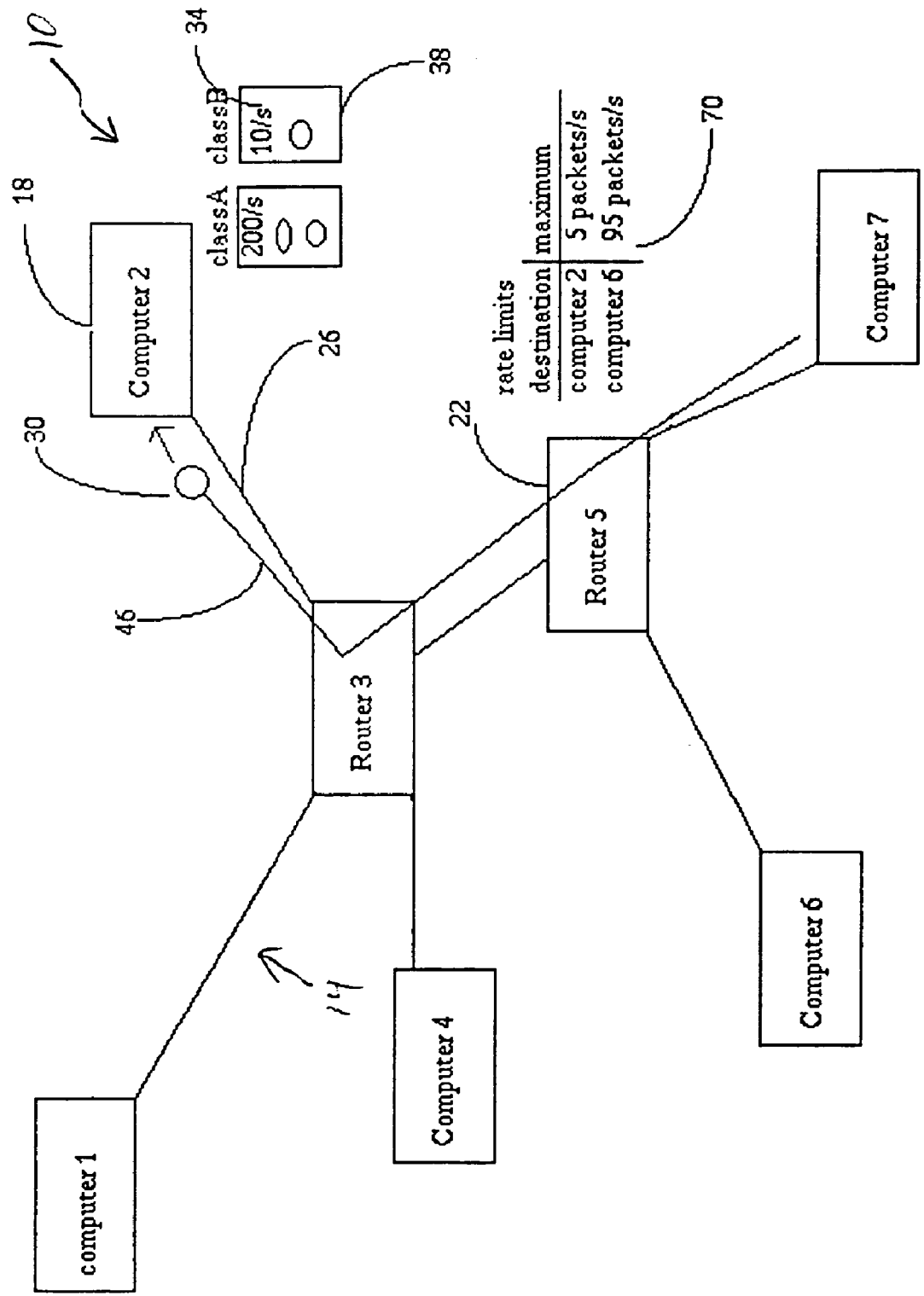
FIG. 2 is a schematic view of a second embodiment illustrating the association of maximum acceptable processing rates for each class of packet received at a computer, a path by which the packets came to the computer and illustrating information received at a router regarding maximum acceptable transmission rate for data packets being transmitted to the computer.

In another variant, as illustrated in FIG. 2, a packet flooding defense system 10 for a network 14 including a plurality of host computers 18, routers 22, communication lines 26 and transmitted data packets 30 includes means for classifying data packets 30 received at a host computer 18 and means for associating a maximum acceptable processing rate 34 with each class 38 of data packet 30 received at the computer 18. Means are provided for the computer 18 to determine the rate at which data packets 30 of each class 38 are transmitted from a router 22 to the computer 18 as are means for the router 22 to receive information regarding maximum acceptable transmission rate 70 for data packets 30 being transmitted to the computer 18. Means are provided for the router 22 to control the rate of transmission of data packets 30 from the router 22 to the computer 18. Thus, the rate of data packet transmissions received at the computer 18 is kept below the maximum acceptable processing rate 34 for each data packet class 38 by the control of the rate of transmission of data packets 30 from the router 22, thereby freeing a portion of the network 14 providing data packet transmission to the computer 18.

Figure 3:
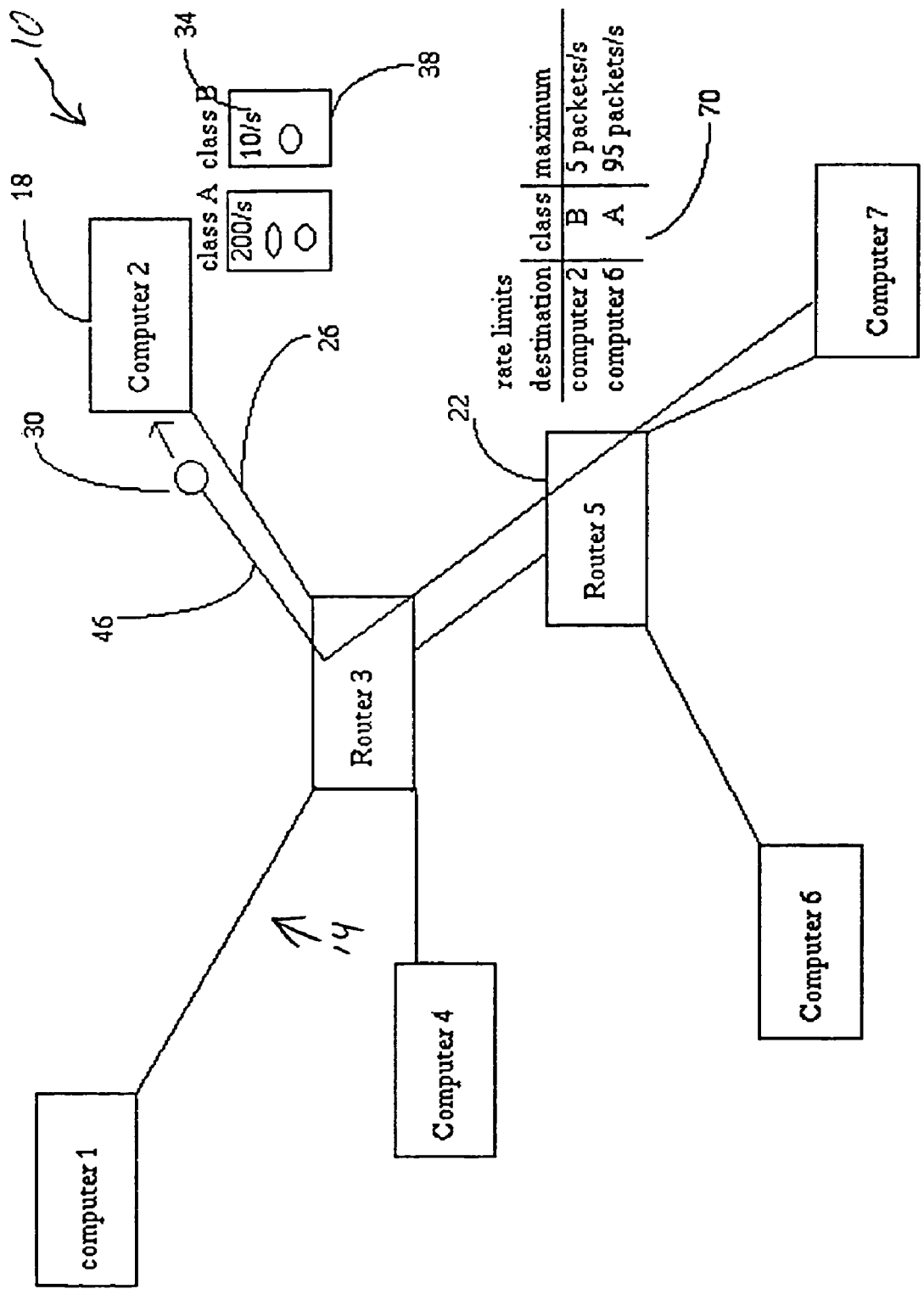
FIG. 3 is a schematic view of a third embodiment illustrating information received at a router regarding maximum acceptable transmission rate for each class of data packets being transmitted to the computer.

In yet another variant, as illustrated in FIG. 3, the router 22 is capable of receiving information regarding maximum acceptable transmission rate 70 for each class 38 of data packet 30 being transmitted to the computer 18 and the router 22 is capable of controlling the rate of transmission of each class 38 of data packets 30 to the computer 18.

Figure 4:
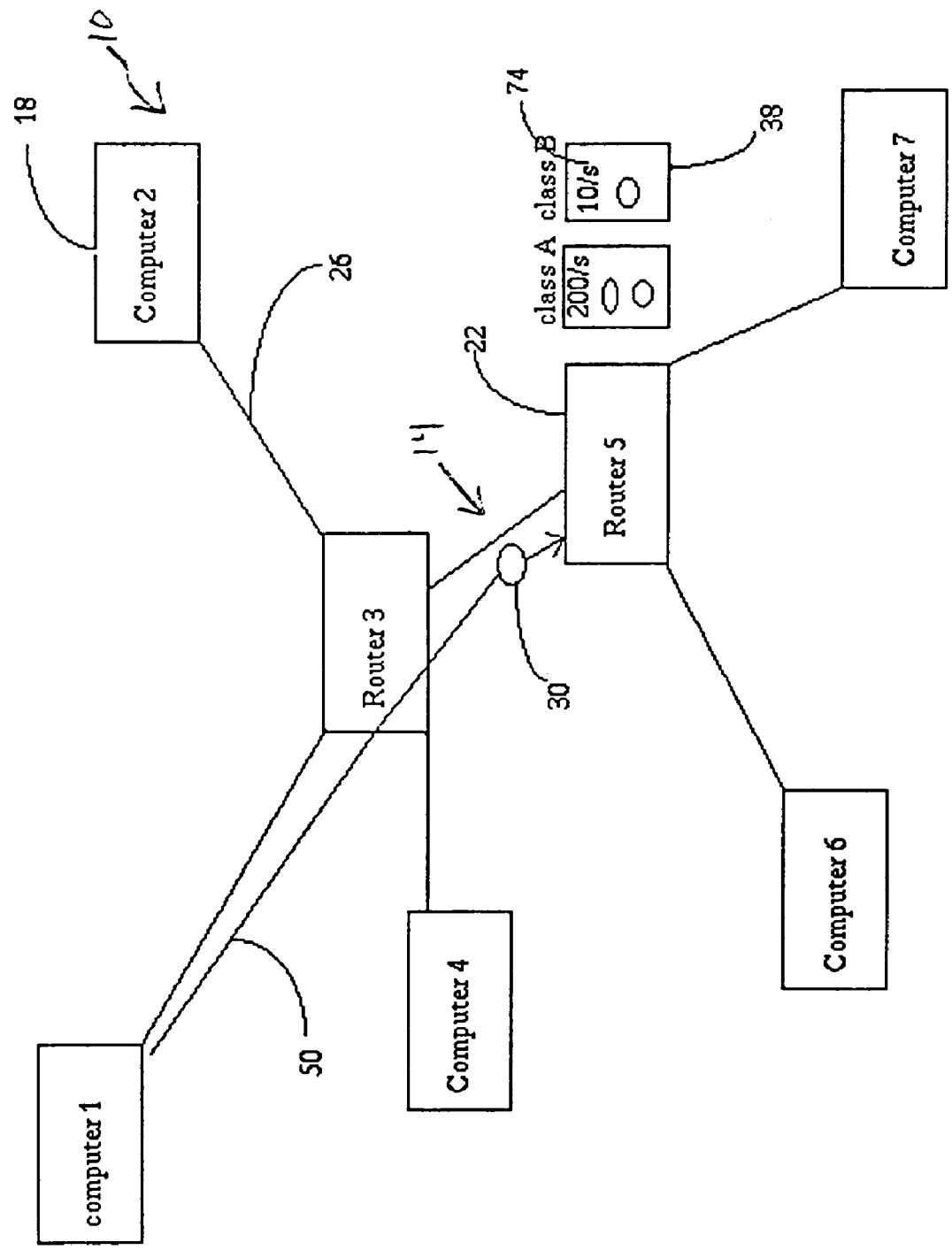
FIG. 4 is a schematic view of a fourth embodiment illustrating association of maximum acceptable transmission rates for each class of packet received at a router and a path by which the packets came to the router.

In still another variant, as illustrated in FIG. 4, a packet flooding defense system 10 for a network 14 including a plurality of host computers 18, routers 22, communication lines 26 and transmitted data packets 30, includes means for classifying data packets 30 received at a router 22 and means for associating a maximum acceptable transmission rate 74 with each class 38 of data packet 30 received at the router 22. Means are provided for the router 22 to find information for packets 30 it receives regarding the path 50 by which the packets 30 came to the router 22. Thus, the router 22 can use the information to allocate the transmission rate for each class 38 in a desired way.

Figure 5:
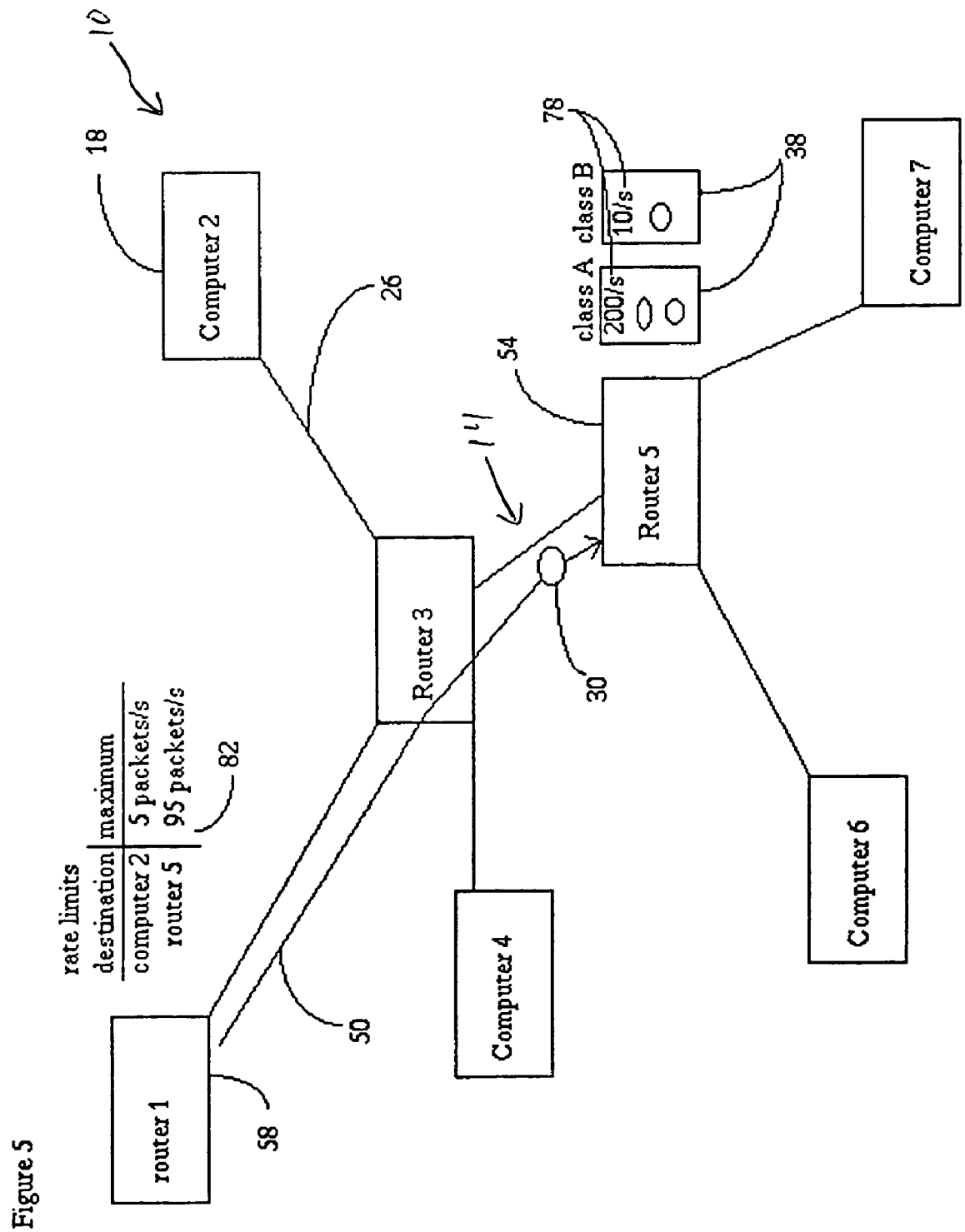
FIG. 5 is a schematic view of a fifth embodiment illustrating the association of maximum acceptable transmission rates for each class of packet received at a first router, a path by which the packets came to the first router and illustrating information received at a second router regarding maximum acceptable transmission rate for data packets being transmitted to the first router.

In a further variant of the invention, as illustrated in FIG. 5, a packet flooding defense system 10 for a network 14 including a plurality of host computers 18, routers 22, communication lines 26 and transmitted data packets 30 includes means for classifying data packets 30 received at a first router 54 and means for associating a maximum acceptable transmission rate 78 with each class 38 of data packet 30 received at the first router 54. Means are provided for the first router 54 to determine the rate at which data packets 30 of each class 38 are transmitted from a second router 58 to the first router 54 as are means for the second router 58 to receive information regarding maximum acceptable transmission rate 82 for data packets 30 being transmitted to the first router 54. Means are provided for the second router 58 to control the rate of transmission of data packets 30 from the second router 58 to the first router 54. Thus, the rate of data packet transmissions received at the first router 54 is kept below the maximum acceptable transmission rate 78 for each data packet class 38 by the control of the rate of transmission of data packets 30 from the second router 58, thereby freeing a portion of the network 14 providing data packet transmission to the first router 54.

Figure 6:
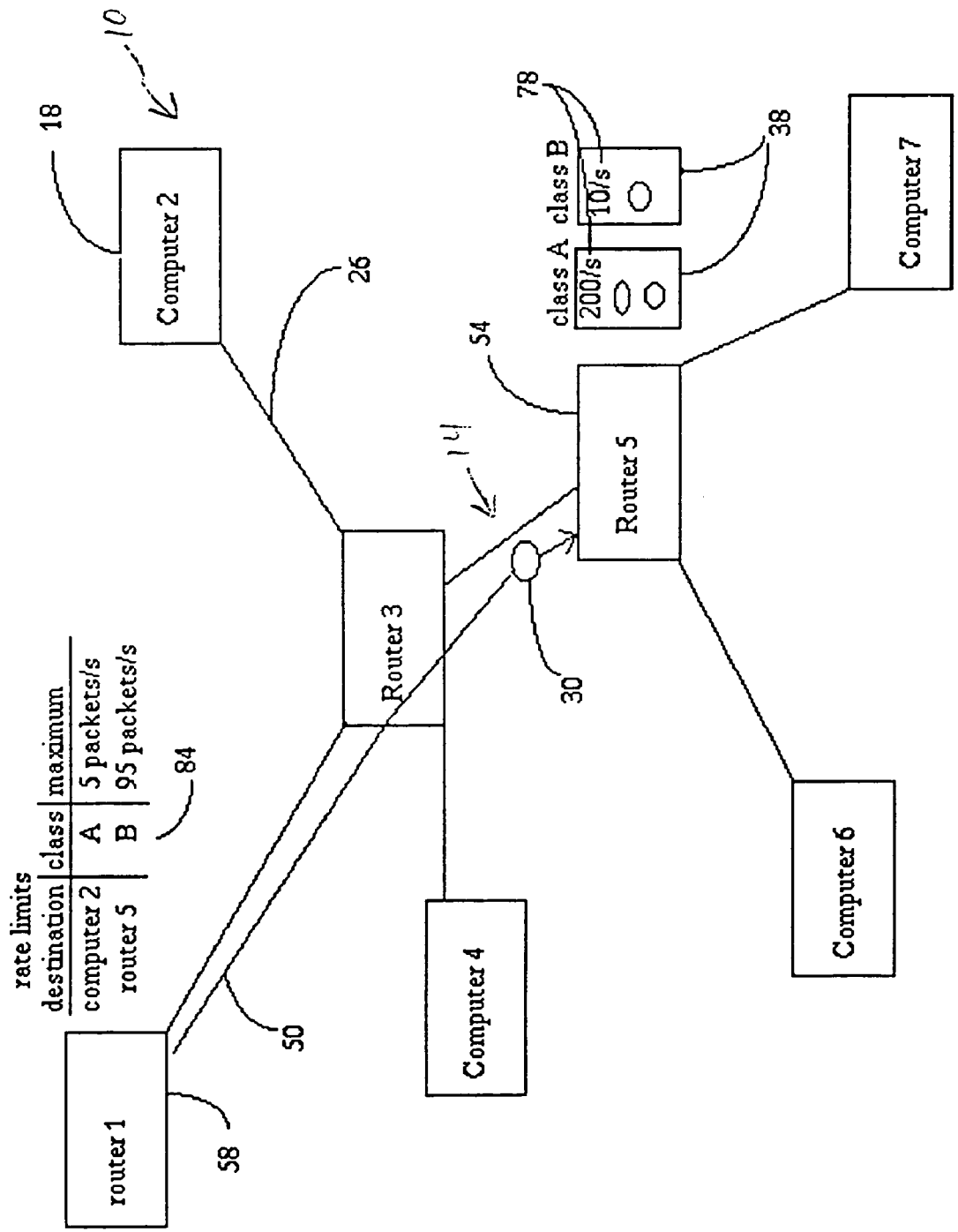
FIG. 6 is a schematic view of a sixth embodiment illustrating information received at the second router regarding maximum acceptable transmission rate for each class of data packets being transmitted to the first router.

In yet a further variant, as illustrated in FIG. 6, the second router 58 is capable of receiving information regarding maximum acceptable transmission rate 84 for each class 38 of data packet 30 being transmitted to the first router 54 and the second router 58 is capable of controlling the rate of transmission of each class 38 of data packets 30 to the first router 54.

Figure 7:
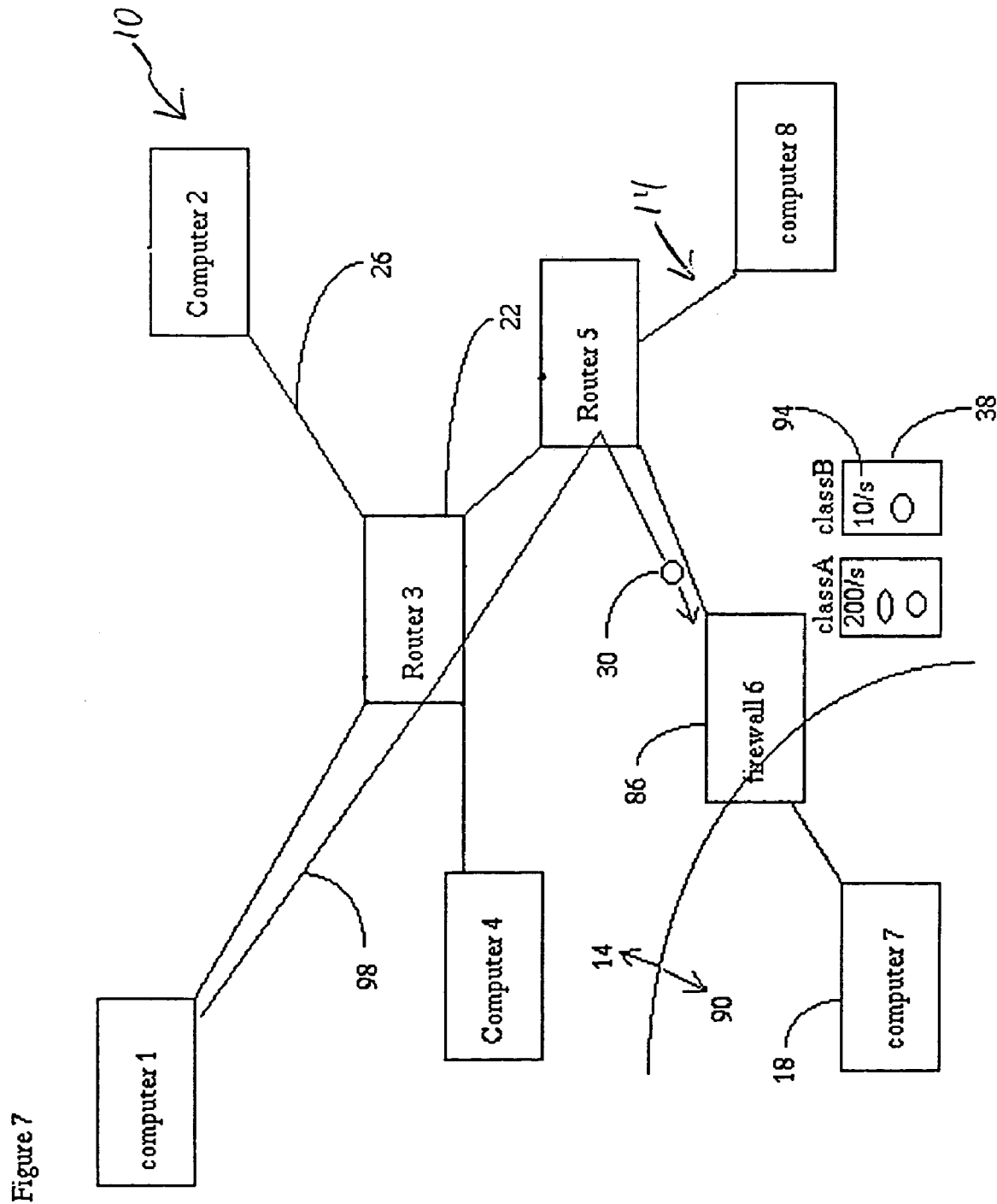
FIG. 7 is a schematic view of a seventh embodiment of the invention illustrating the association of maximum acceptable transmission rates for each class of packet received at a firewall and a path by which the packets came to the firewall.

In another variant, as illustrated in FIG. 7, a packet flooding defense system 10 for a network 14 including a plurality of host computers 18, routers 22, communication lines 26 and transmitted data packets 30 includes at least one firewall 86. The firewall 86 includes hardware and software serving to control packet transmission between the network 14 and a host computer 18 connected to an internal network 90. Means are provided for classifying data packets 30 received at the firewall 86 as are means for associating a maximum acceptable transmission rate 94 with each class 38 of data packet 30 received at the firewall 86. Means are provided for the firewall 86 to find information for packets 30 it receives regarding the path 98 by which the packets 30 came to the firewall 86. Thus, the firewall 86 can use the information to allocate the transmission rate for each class 38 in a desired way.

Figure 8:
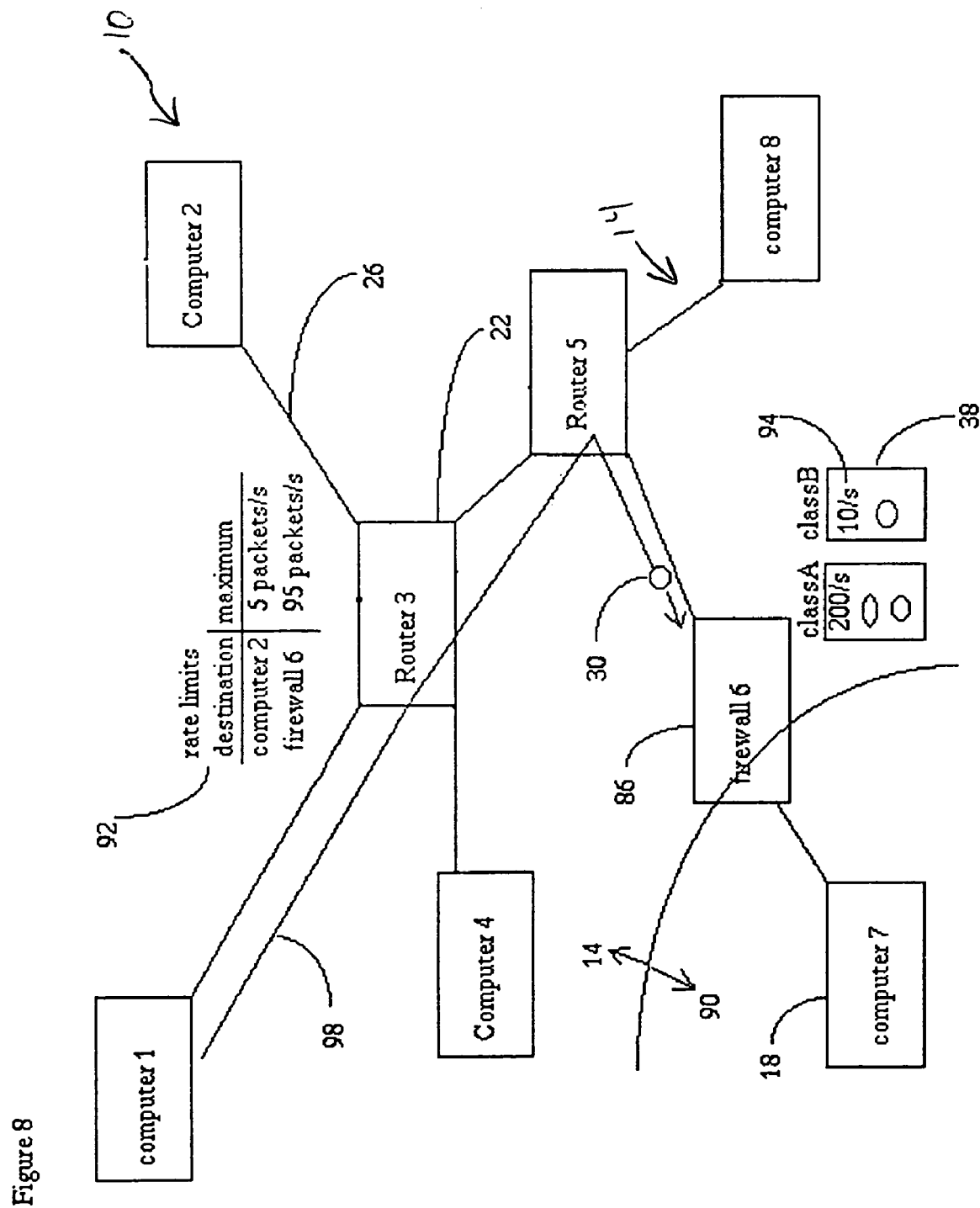
FIG. 8 is a schematic view of an eighth embodiment illustrating the association of maximum acceptable transmission rates for each class of packet received at the firewall, a path by which the packets came to the firewall and illustrating information received at a router regarding maximum acceptable transmission rate for data packets being transmitted to the firewall.

In still another variant of the invention, as illustrated in FIG. 8, a packet flooding defense system 10 for a network 14 including a plurality of host computers 18, routers 22, communication lines 26 and transmitted data packets 30 includes at least one firewall 86. The firewall 86 includes hardware and software serving to control packet transmission between the network 14 and a host computer 18 connected to an internal network 90 and means for classifying data packets 30 received at the firewall 86. Means are provided for associating a maximum acceptable transmission rate 94 with each class 38 of data packet 30 received at the firewall 86 as are means for the firewall 86 to determine the rate at which data packets 30 of each class 38 are transmitted from a router 22 to the firewall 86. Means are provided for the router 22 to receive information regarding maximum acceptable transmission rate 92 for data packets 30 being transmitted to the firewall 86 as are means for the router 22 to control the rate of transmission of data packets 30 from the router 22 to the firewall 86. Thus, the rate of data packet transmissions received at the firewall 86 is kept below the maximum acceptable transmission rate 94 for each data packet class 38 by the control of the rate of transmission of data packets 30 from the router 22, thereby freeing a portion of the network 14 providing data packet transmission to the firewall 86.

Figure 9:
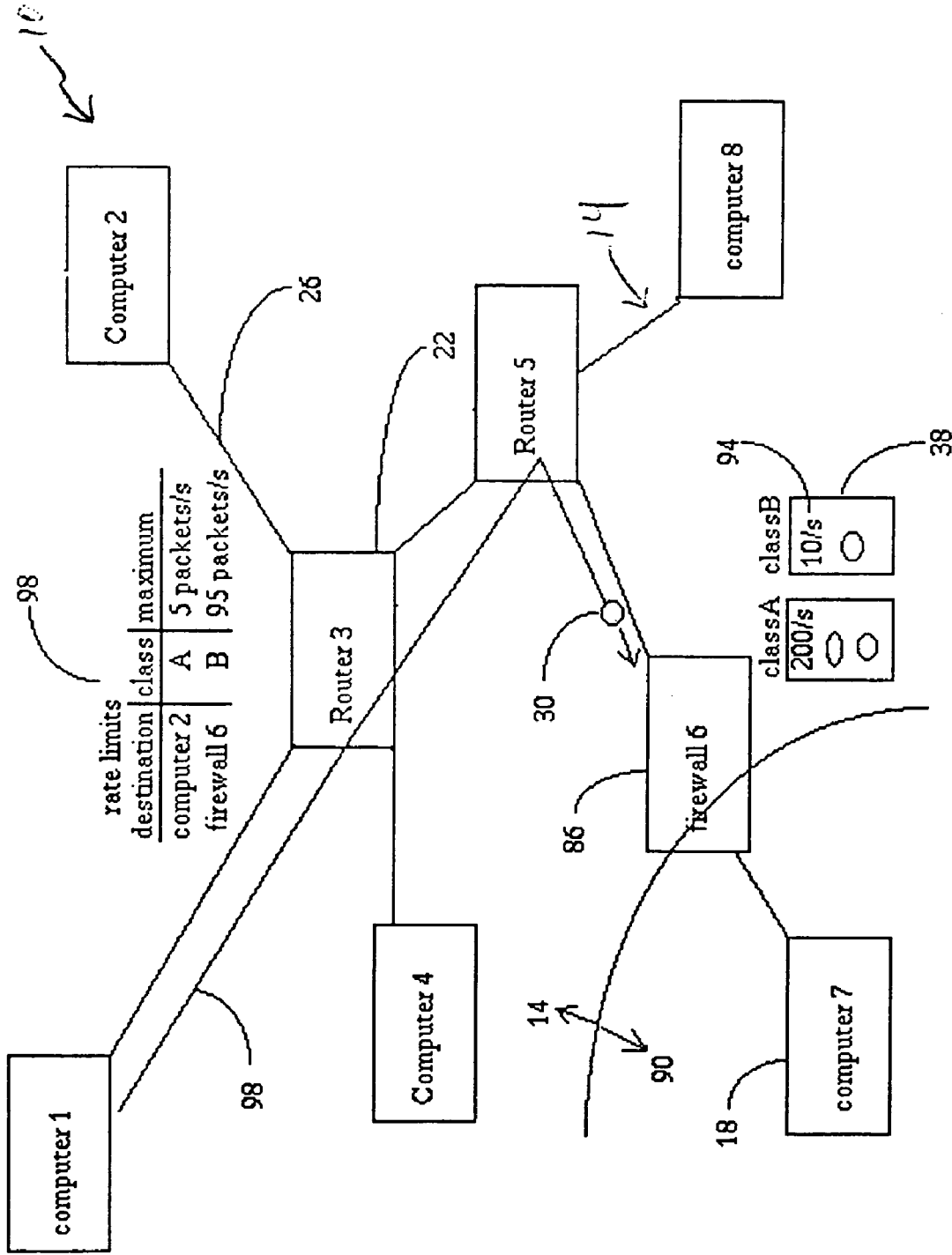
FIG. 9 is a schematic view of a ninth embodiment illustrating information received at a router regarding maximum acceptable transmission rate for each class of data packets being transmitted to the firewall.

In a final variant of the invention, as illustrated in FIG. 9, the router 22 is capable of receiving information regarding maximum acceptable transmission rate 98 for each class 38 of data packet 30 being transmitted to the firewall 86 and the router 22 is capable of controlling the rate of transmission of each class 38 of data packets 30 to the firewall 86.

The packet flooding defense system 10 has been described with reference to particular embodiments. Other modifications and enhancements can be made without departing from the spirit and scope of the claims that follow.

The invention claimed is:

1. A packet flooding defense system for a network comprising a plurality of host computers, routers, communication lines and transmitted data packets, said system comprising:
    means for classifying data packets received at a host computer into wanted data packets and unwanted data packets;
    means for associating a maximum acceptable processing rate with each class of data packet received at said computer;
    means for said computer to find information for packets it receives regarding the path by which said packets came to said computer via packet marks provided by routers leading to said host computer; said path comprising all routers in said network via which said packets are routed to said computer; and
    means in said computer for using said information to allocate the processing rate available for unwanted data packets to be less than or equal to said maximum acceptable processing rate.

2. A packet flooding defense system for a network comprising a plurality of host computers, routers, communication lines and transmitted data packets, said system comprising:
    means for classifying data packets received at a host computer into wanted data packets and unwanted data packets; said data packets comprising data packets from all routers in said network via which said data packets are routed to said computer;
    means for associating a maximum acceptable processing rate with each class of data packet received at said computer;
    means for said computer to determine the rate at which data packets of each class are transmitted from a router to said computer;
    means for said router to receive information regarding maximum acceptable transmission rate for data packets being transmitted to said computer;
    means for said router to control the rate of transmission of data packets from said router to said computer; and
    means in said computer for keeping the rate of data packet transmissions received at said computer below the maximum acceptable processing rate for each data packet class by said control of the rate of transmission of data packets from said router, and freeing a portion of the network providing data packet transmission to said computer.

3. A packet flooding defense system as described in claim 2, wherein:
    said router receives information regarding maximum acceptable transmission rate for each class of data packet being transmitted to said computer; and said router controls the rate of transmission of each class of data packet to said computer.

4. A packet flooding defense system for a network comprising a plurality of host computers, routers, communication lines and transmitted data packets, said system comprising:
    means for classifying data packets received at a router into wanted data packets and unwanted data packets;
    means for associating a maximum acceptable transmission rate with each class of data packet received at said router;

means for said router to find information for packets it receives regarding the path by which said packets came to said router via packet marks provided by routers leading to said host computer;

said path comprising all routers in said network via which said packets are routed to said computer; and means in said router for said router to use said information to allocate the transmission rate for unwanted data packets to be less than equal to said maximum acceptable transmission rate.

5. A packet flooding defense system for a network comprising a plurality of host computers, routers, communication lines and transmitted data packets, said system comprising:

means for classifying data packets received at a first router into wanted data packets and unwanted data packets; said data packets comprising data packets from all routers in said network via which said data packets are routed to said computer;

means for associating a maximum acceptable transmission rate with each class of data packet received at said first router;

means for said first router to determine the rate at which data packets of each class are transmitted from a second router to said first router;

means for said second router to receive information regarding maximum acceptable transmission rate for data packets being transmitted to said first router;

means for said second router to control the rate of transmission of data packets from said second router to said first router; and means in said first router for keeping the rate of data packet transmissions received at said first router below the maximum acceptable transmission rate for unwanted data packets by said control of the rate of transmission of data packets from said second router, and freeing a portion of the network providing data packet transmission to said first router.

6. A packet flooding defense system as described in claim 5, wherein:

said second router receives information regarding maximum acceptable transmission rate for each class of data packet being transmitted to said first router; and said second router controls the rate of transmission of each class of data packet to said first router.

7. A method of providing packet flooding defense for a network comprising a plurality of host computers, routers, communication lines and transmitted data packets, said method comprising the steps of:

determining a path by which data packets arrive at a host computer via packet marks provided by routers leading to said host computer; said path comprising all routers in said network via which said packets are routed to said computer;

classifying data packets received at said host computer into wanted data packets and unwanted data packets by path;

associating a maximum acceptable processing rate with each class of data packet received at said host computer; and allocating a processing rate less than or equal to said maximum acceptable processing rate for unwanted data packets.

8. A method of providing packet flooding defense for a network comprising a plurality of host computers, routers, communication lines and transmitted data packets, said method comprising the steps of:

classifying data packets received at a host computer into wanted data packets and unwanted data packets; said data packets comprising data packets from all routers in said network via which said data packets are routed to said computer;

associating a maximum acceptable processing rate with each class of data packet received at said computer;

determining the rate at which data packets of each class are transmitted from a router to said computer;

receiving a maximum acceptable transmission rate for data packets being transmitted to said computer in said router; and controlling the rate of transmission of data packets from said router to said computer by said router so that data packet transmissions received at said computer are kept below the maximum acceptable processing rate for each data packet class; and freeing a portion of the network providing data packet transmission to said computer.

9. A method as described in claim 8, in which:

said router receives information regarding maximum acceptable transmission rate for each class of data packet being transmitted to said computer; and said router controls the rate of transmission of each class of data packet to said computer.

10. A method of providing packet flooding defense for a network comprising a plurality of host computers, routers, communication lines and transmitted data packets, said method comprising the steps of:

determining a path by which data packets arrive at said router via packet marks provided by routers leading to said host computer; said path comprising all routers in said network via which said packets are routed to said computer;

classifying data packets received at said router via packet marks provided by routers leading to said host computer by path;

associating a maximum acceptable transmission rate with each class of data packet received at said router; and allocating a transmission rate equal to or less than said maximum acceptable transmission rate for unwanted data packets.

11. A method of providing packet flooding defense for a network comprising a plurality of host computers, routers, communication lines and transmitted data packets, said method comprising the steps of:

classifying data packets received at a first router into wanted data packets and unwanted data packets; said data packets comprising data packets from all routers in said network via which said data packets are routed to said computer;

associating a maximum acceptable transmission rate with each class of data packet received at said first router;

determining by said first router of the rate at which data packets of each class are transmitted from a second router to said first router;

receiving by said second router of information regarding maximum acceptable transmission rate for data packets being transmitted to said first router; and controlling by said second router of the rate of transmission of data packets from said second router to said first router so that said rate of transmission is below the maximum acceptable transmission rate for each data packet class; and freeing a portion of the network providing data packet transmission to said first router.

12. A method as described in claim 11, in which:
said second router receives information regarding maximum acceptable transmission rate for each class of data packet being transmitted to said first router; and
said second router controls the rate of transmission of each class of data packets to said first router.

13. A packet flooding defense system for a network comprising a plurality of host computers, routers, communication lines and transmitted data packets, said system comprising:
means for determining a path by which data packets arrive at a host computer via packet marks provided by routers leading to said host computer; said path comprising all routers in said network via which said packets are routed to said computer;
means for classifying data packets received at said host computer into wanted data packets and unwanted data packets by path;
means for assigning a maximum acceptable processing rate to each class of data packet; and
means for allocating a processing rate equal to or less than said maximum acceptable processing rate to said unwanted data packets.

14. A packet flooding defense system for a network comprising a plurality of host computers, routers, communication lines and transmitted data packets, said system comprising:
means for classifying data packets received at a host computer into wanted data packets and unwanted data packets; said data packets comprising data packets from all routers in said network via which said data packets are routed to said computer;
means for associating a maximum acceptable processing rate with each class of data packet received at said computer;
means for said computer to determine the rate at which data packets of each class are transmitted from a router to said computer;
means for said router to receive information regarding maximum acceptable transmission rate for data packets being transmitted to said computer; and
means for said router to control the rate of transmission of data packets from said router to said computer so that the rate of data packet transmissions received at said computer is kept below the maximum acceptable processing rate for each data packet class; and
freeing a portion of the network providing data packet transmission to said computer.

15. A packet flooding defense system as described in claim 14, in which:
said router receives information regarding maximum acceptable transmission rate for each class of data packet being transmitted to said computer; and
said router controls the rate of transmission of each class of data packet to said computer.

16. A packet flooding defense system for a network comprising a plurality of host computers, routers, communication lines and transmitted data packets, said system comprising:
means for a router to determine a path by which said packets came to said router via packet marks provided by routers leading to said router; said path comprising all routers in said network via which said packets are routed to said computer;
means for classifying data packets received at said router into wanted data packets and unwanted data packets by path;
means for associating a maximum acceptable transmission rate with each class of data packet received at said router; and
means for said router to allocate the transmission rate for unwanted data packets to be less than equal to said maximum acceptable processing rate.

17. A packet flooding defense system for a network comprising a plurality of host computers, routers, communication lines and transmitted data packets, said system comprising:
means for classifying data packets received at a first router into wanted data packets and unwanted data packets; said data packets comprising data packets from all routers in said network via which said data packets are routed to said computer;
means for associating a maximum acceptable transmission rate with each class of data packet received at said first router;
means for said first router to determine the rate at which data packets of each class are transmitted from a second router to said first router;
means for said second router to receive information regarding maximum acceptable transmission rate for data packets being transmitted to said first router; and
means for said second router to control the rate of transmission of data packets from said second router to said first router so that the rate of data packet transmission received at said first router is kept below the maximum acceptable transmission rate for each data packet class; and
freeing a portion of the network providing data packet transmission to said first router.

18. A packet flooding defense system as described in claim 17, wherein:
said second router receives information regarding maximum acceptable transmission rate for each class of data packet being transmitted to said first router; and
said second router controls the rate of transmission of each class of data packet to said first router.

* * * * *